United States Patent [19]

Smith et al.

[11] 4,000,109

[45] Dec. 28, 1976

[54] THERMOPLASTIC POLYESTER COMPOSITIONS

[75] Inventors: Clive Percy Smith, Wheathampstead; Martin Keith Thompson, Biggleswade, both of England

[73] Assignee: Imperial Chemical Industries Limited, London, England

[22] Filed: July 28, 1975

[21] Appl. No.: 599,347

[30] Foreign Application Priority Data

Aug. 5, 1974 United Kingdom ............ 34336/74

[52] U.S. Cl. ........................... 260/40 R; 106/292; 260/45.75 W

[51] Int. Cl.² .......................................... C08K 3/38

[58] Field of Search ............... 260/40 R, 45.75 W; 106/292

[56] References Cited

UNITED STATES PATENTS

| | | | |
|---|---|---|---|
| 3,591,548 | 7/1971 | Beckman et al. | 260/45.75 W |
| 3,671,487 | 6/1972 | Aholins | 260/40 R |
| 3,745,140 | 7/1973 | Segal | 260/40 R |
| 3,751,396 | 8/1973 | Gall | 260/40 R |

*Primary Examiner*—Donald E. Czaja
*Assistant Examiner*—S. M. Person
*Attorney, Agent, or Firm*—Cushman, Darby & Cushman

[57] ABSTRACT

Poly(tetramethylene terephthalate) compositions containing at least 2.5% by weight of the composition of a finely divided metal borate stable under the normal processing conditions for the polyester.

12 Claims, No Drawings

THERMOPLASTIC POLYESTER COMPOSITIONS

This invention relates to polyester compositions and in particular to poly(tetramethylene terephthalate) compositions containing additives for enhancing the electrical performance of the polyester.

Poly(tetramethylene terephthalate) is of growing importance as a moulding powder, particularly in applications where its excellent electrical properties can be utilised. For some electrical applications, however, the mouldings must be able to withstand very severe conditions and it is necessary to uprate the electrical properties of the polyester. It is particularly important for some applications that polyester mouldings should have a high degree of resistance to carbonisation when directly exposed to an electrical discharge or when subjected to excessive leakage current across the surface due to the presence of surface contaminants. Materials which have a high degree of resistance to visible electrical discharges are said to have good arc resistance. Those materials which resist carbonisation due to leakage current in the presence of surface contaminants are said to have good track resistance.

Many additives have been suggested for conferring such carbonisation resistance on polymers but many of these are either unsuitable for compounding with poly(tetramethylene terephthalate) under melt conditions because of volatilisation of by-products or give only a moderate arc or track resistance.

Compositions containing poly(tetramethylene terephthalate) have now been developed which show excellent arc and track resistance and can readily be prepared by the normal compounding methods.

Accordingly there are provided poly(tetramethylene terephthalate) compositions comprising poly(tetramethylene terephthalate) and at least 2.5% by weight of the total compositions of at least one finely-divided metal borate that is stable under the normal processing conditions for the polyester.

By "poly(tetramethylene terephthalate)" is meant a linear polymer containing at least 80 mole % of units derived from terephthalic acid and 1,4-butanediol. The remaining constituents of the polymer, if any, may be derived from other aromatic dicarboxylic acids such as isophthalic acid and 1,2-bis-(4-carboxyphenoxy) ethane and dihydric alcohols containing from 2 to 10 carbon atoms such as ethylene glycol. The constituents other than terephthalic acid and 1,4-butane diol may be halogenated materials in order that a measure of fire retardancy may be introduced into the polyester. Preferred halogenated materials are ethoxylated tetrabromo bisphenol A and dibromomethyl terephthalate. Polyesters having modified melt flow characteristics may be prepared by the inclusion of a minor amount of components having a functionality of at least 3, such as tri- and tetra-carboxylic acids and polyols having at least 3 hydroxyl groups such as pentaerythritol. When present, these may be included in an amount sufficient to give rise to a branched material but insufficient to give rise to cross-linked polymers which are not readily processable under melt conditions.

The poly(tetramethylene terephthalate) used to make up the composition should be a polymer of high molecular weight, preferably having an intrinsic viscosity (measured as a 1% by weight solution in o-chlorophenol) of at least 0.75.

The metal borates for use in the invention must be stable under the processing conditions normally used for the polyester, that is, no substantial amount of material should volatilise when the compositions are processed either during compounding of the ingredients by the manufacturer or during fabrication or shaped articles from the compositions. The physical nature of the borates should be such that they are capable of being intimately dispersed in the polyester. Hydrated borates are preferred because they show superior resistance to carbonisation in the compositions of the invention. The hydrated borates must not, of course, lose a substantial amount of water during processing. The higher hydrates of zinc borate for example $2ZnO.3B_2O_3.7H_2O$ and $2ZnO.3B_2O_3.9H_2O$ lose water below the procesing temperatures of the polyesters used in the invention and are therefore unsuitable because they are difficult to blend with the polyamides and would present problems during melt fabrication of the compositions into shaped articles. The preferred metal borate is zinc borate of the from $2ZnO.3B_2O_3.xH_2O$, where x is between 3.3 and 3.7. The preparation of such compounds is described in British Pat. specification No. 1,184,967. The preferred hydrated zinc borate is of formula $2ZnO.3B_2O_3.3.5H_2O$ and is stable to volatilisation up to 260° C or more.

The concentration of borate employed to obtain a useful effect should be at least 2.5% by weight of the total composition. For some applications 5 or 10% is sufficient to give a noticeable improvement in electrical performance but where high arc resistance values are required it may be necessary to use from 20 to 40% by weight of borate. Quantities in excess of 40% by weight of the total composition may be employed but at these higher concentrations, however, the other physical properties may be reduced below a level which is acceptable for a particular end-use of the moulding.

Particularly useful compositions are obtained when a reinforcing agent, such as glass fibre, acicular dawsonite, acicular calcium metasilicate asbestos fibre and mica, is included in the composition. These may be included at a concentration of 2 to 70% preferably 10 to 50% by weight of the total composition. In addition, the electrical application envisaged may require that the moulding is self-extinguishing and in these circumstances fire-retardant materials may be included in the compositions if the polyester itself does not contain sufficient copolymerised fire retardant materials to give the required level of fire retardancy. The presence of fire retardants either in the admixture of copolymerised form generally improves the arc resistance of the compositions. Preferred fire retardants are the brominated organic materials optionally used together with an antimony compound, particularly antimony trioxide. The compositions of the invention containing sufficient fire retardants to render the mouldings self-extinguishing have the additional advantage that they are generally found not to drip in the standard fire-retardancy tests such as the Underwriters Laboratories Test UL94 using a sample thickness of 1.5mm or less. Other additives may be included provided they do not have a deleterious effect on the arc resistance of the compositions.

The compositions of the invention find uses in many electrical applications requiring a high resistance to arcing and tracking, such as distributor caps.

The testing procedure used to evaluate the arc resistance of mouldings formed from the compositions is the Performance Standard described in Vol. L page 187(2) dated Aug. 27, 1963 of the Chrysler Corporation Performance Standards. This employs high-voltage low-current conditions in a dry atmosphere. In this test a distributor (Lucas type D/1506/1) is driven by an electric motor at 1350 r.p.m. so that the contact breaker of the distributor delivers a pulsed voltage which is fed to a Lucas Sports ignition coil (Type SA 12). A low-voltage power supply delivers 14 V when the contact is open, dropping to about 8 V when the equipment is running. The high-tension output produced in the coil is about 15 kV and is fed via a suppressed carbon lead to a male high-tension contact. A "Variac" feeding the low-voltage power supply is used to control the current in the system to 3.0 ± 0.1 mA. The test sample is in the form of the cylindrical chimney of a distributor cap, the male high-tension probe being a sliding fit within the chimney. The arc resistance of the chimney is tested by striking an arc using the apparatus described between the male high-tension contact and an earth probe contacting the chimney 1.25 cm from the end of the chimney into which the male electrode is inserted and exerting a load of 196 g on the chimney. The contact end of the earth probe is conical in shape, the cone having an included angle of 30°. Failure is detected by observing the time at which the visible arcing is replaced by a glowing track. Simultaneously, the noise created by the arc ceases.

To assess the performance under low-voltage high-current moist conditions the test of British Standard 3781:1964 is used. This test measures the Comparative Tracking Index (CTI) which indicates the voltage at which it takes 50 drops of electrolyte to cause failure by the formation of electrically conducting tracks. The tracking resistance of compositions may also be assessed by the method of DIN specification 53480/1972 using the KC method described therein.

The invention is further illustrated by the following Examples of which Example 1 and 2 are for comparison purposes only.

EXAMPLE 1

In this example the arc resistance and Comparative Tracking Index (CTI) of poly(tetramethylene terephthalate) of intrinsic viscosity 0.95 (measured as a 1% solution in o-chlorophenol) and containing glass-fibre and fire-retardant additives were assessed according to the Chrysler Arc Test and British Standard 3781:1964. The compositions and the results obtained are recorded below. The compositions were obtained by compounding in a vented screw extruder at 240° C. The percentages quoted are by weight of the total composition.

| Glass Fibre (%) | Decabromo-diphenyl Ether (%) | Antimony Oxide (%) | Additives Chrysler Arc Test Time to Failure (sec) | CTI BS3781: 1964 | CTI DIN 53480 (KC) | Tensile MN/m² Strength |
|---|---|---|---|---|---|---|
| 20 | 8 | 5 | 131 | | | 92 |
| 30 | 7 | 4 | 90 | 190 | 230 | 132 |
| 30 | 10 | 5 | 276 | | | |

These results indicate that although the glass content of the composition does not have a significant effect on the arc resistance the fire retardant additives do.

EXAMPLE 2

The compositions listed in the table below were compounded as in Example 1 to test the effect in poly (tetramethylene terephthalate) of some of the additives previously suggested for improving the arc resistance of polymers. The poly(tetramethylene terephthalate) used was the same material as used in Example 1.

| Glass | Decabromo-diphenyl Ether | Antimony Oxide | Additives (%) Arc Resistant Additive (%) | Arc Test Time to Failure (sec) | CTI BS3781 1964 | CTI DIN 53480 (KC) | Tensile Strength MN/m² |
|---|---|---|---|---|---|---|---|
| 20 | 7 | 4 | 20 Acicular Calcium Matasilicate | 314 | | 250 | |
| 20 | 7 | 4 | 20 "Mistron Super Frost" talc* | 540 | | | |
| 20 | 7 | 4 | 20 "Norwegian Micro-Talc IT" | 344 | | | 91 |
| 20 | 7 | 4 | 20 Al₂O₃3H20** | 720 | 230 | | 82 |
| 20 | 7 | 4 | 20 "Mica W160"*** | 450 | | | |
| 20 | 7 | 4 | 20 "Mica MTS1000"**** | 330 | | | |
| 20 | 7 | 4 | 20 Stearate coated CaCO₃ ('Winnofil' S)***** | 6 | | | 90 |
| 20 | 7 | 4 | 20 Al₂O₃.3H₂O + 5Fe₂O₃ | 9 | 200 | | 79 |
| 10 | 7 | 4 | 10 Al₂O₃ (anhydrous) | 320 | | | |

*"Mistron Super Frost" talc was obtained from the Sierra Talc Company.
"Norwegian Micro-Talc IT" was obtained from Norwegian Talc of Bergen.
**The Al₂O₃3H₂O used was obtained as Omya H-BM2 from Plastichem Limited.
***Mica W160 was obtained from Norwegian Talc of Bergen.
****Mica MTS1000 was obtained from Mineral and Technical Services Limited.
*****'Winnofil' S was obtained from Imperial Chemical Industries Limited, Mond Division.

These results show that by comparison with Example 1 a variety of materials can be used to effect some improvement in arc resistance. Hydrated alumina is exceptionally good, but in practice it has been found that this material is difficult to compound into molten poly(tetramethylene terephthalate) becuase water of hydration is lost at processing temperatures resulting in the production of a porous lace that is difficult to haul off from the extruder even with efficient venting. Such a product would be unacceptable to the fabricator.

EXAMPLE 3

Hydrated zinc borate $2ZnO.3B_2O_3.3.5H_2O$ (obtained from Borax Consolidated Limited) was compounded into the poly(tetramethylene terephthalate) used in Example 1 together with glass-fibre and fire-retardant additives using a vented screw extruder at 240° C. The compositions produced are listed below together with the results obtained from moulded samples.

| Glass | Decabromo-diphenyl Ether | Antimony Oxide | Hydrated Zinc borate | Arc Test Time to failure (sec) | CTI BS3781: 1964 | CTI DIN 53480 (KC) | Tensile Strength $MN/m^2$ |
|---|---|---|---|---|---|---|---|
| 10 | 7 | 4 | 20 | 960 | | | 61 |
| 10 | 7 | 4 | 30 | 925 | | | 54 |
| 20 | 7 | 4 | 20 | 1113 | >260 | 350 | 81 |

These results exhibit an exceptional improvement over the compositions of Example 2 in arc resistance and Comparative Tracking Index. In addition the fire-retardancy of the composition containing 20% glass was tested according to the Vertical Burning Test of Underwriters Laboratories UL94 test. On a sample thickness of 1.5mm the composition has a rating of 94 V-O and did not drip.

EXAMPLE 4

The procedure of Example 3 was followed except in that glass was omitted from the compositions. The compositions and the results obtained are listed below.

| Decabromo-diphenyl Ether | Antimony Oxide | Hydrated Zinc Borate | Others | Arc Test Time to Failure (secs) | Tensile Strength $(MN/m^2)$ |
|---|---|---|---|---|---|
| 7 | 4 | 40 | — | 740 | 50 |
| 7 | 4 | 20 | 20 Mica MTS 1000 | 621 | 53 |

These results indicate that exceptionally good levels of arc resistance can be obtained in the absence of glass.

EXAMPLE 5

A series of compositions containing poly(tetramethylene terephthalate), 30% by weight of glass fibre, 7% by weight of decabromodiphenyl ether and 4% by weight of antimony oxide and varying concentrations of the zinc borate used in Example 3 were compounded under the conditions used in Example 1. The compositions were moulded into test pieces and the results obtained are recorded below.

| Zinc borate Concentration (%) | CTI DIN 53480 (KC) | UL94 (1.5mm thick test piece) |
|---|---|---|
| 0 | 230 | 94VO : dripped |
| 5 | 260 | 94VO : did not drip |
| 10 | 290 | 94VO : did not drip |

The results show that an appreciable improvement in CTI value is obtained with 5% zinc borate and that the burning performance of the composition is exceptionally good.

EXAMPLE 6

Compositions containing 49% by weight of the polyester used in Example 3 together with 20% by weight of glass fibre, 20% by weight of the zinc borate used in Example 3, 7% by weight of decabromodiphenyl ether and 4% by weight of antimony trioxide were compounded at 240° C in a vented screw extruder. The composition was found to have a CTI value of 360 volts as measured by the KC method of DIN 53480 (1972) and a 94VO rating as assessed by the Vertical Burning Test of the UL94 test using a test sample 1.5 mm thick. The composition was also non dripping in the UL94 test.

We claim:
1. A thermoplastic polyester composition comprising poly(tetramethylene terephthalate) and at least 2.5% by weight of the total composition of at least one finely divided metal borate that is stable under the normal processing conditions of the polyester.

2. A composition according to claim 1 which includes from 2-70% by weight of reinforcing agent.

3. A composition according to claim 2 in which the reinforcing agent is selected from at least one of glass fibre, acicular dawsonite, acicular calcium metasilicate, asbestos fibre and mica.

4. A composition according to claim 1 which includes fire retardant additives in admixture with, or copolymerised in, the polyester.

5. A composition according to claim 4 containing at least sufficient copolymerised or admixed fire retardant materials to give the composition a flame retardancy rating of 94VO and at least sufficient metal borate to prevent the composition dripping when tested according to the Vertical Burning Test of Underwriters Laboratories Test UL94 using test samples 1.5 mm or less in thickness.

6. A composition according to claim 5 in which the metal borate concentration is sufficient to give a Comparative Tracking Index rating as measured by the KC method of DIN 53480 (1972) of at least 350 volts.

7. A composition according to claim 1 in which the metal borate is zinc borate of formula

$2ZnO.3B_2O_3.xH_2O$ where $x$ is between 3.3 and 3.7.

8. A composition according to claim 7 in which the concentration of zinc borate is between 2.5% and 40% by weight of the total composition.

9. A composition according to claim 1 in which the intricsic viscosity of the polyester is at least 0.75 measured as a 1% by weight solution in ortho-chlorophenol.

10. The composition of claim 1, wherein said metal borate is a hydrated borate.

11. A composition according to claim 2, in which the metal borate is a zinc borate of formula $$2ZnO.3B_2O_3.xH_2O$$

where $x$ is between 3.3 and 3.7.

12. The composition according to claim 4, in which the metal borate is a zinc borate of formula $$2ZnO.3B_2O_3.xH_2O$$

where $x$ is between 3.3 and 3.7.

* * * * *